M. HÖCHSTÄDTER.
SYSTEM FOR PROTECTING ELECTRIC CURRENT DISTRIBUTING NETS AGAINST TEMPORARY INTERRUPTIONS.
APPLICATION FILED OCT. 20, 1914.
1,404,437. Patented Jan. 24, 1922.
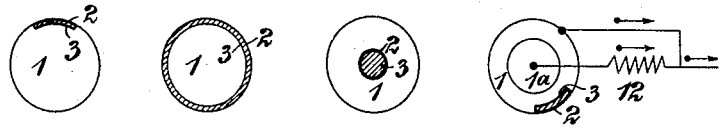
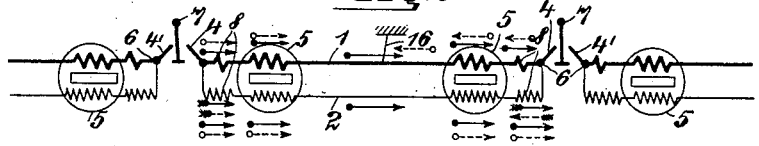
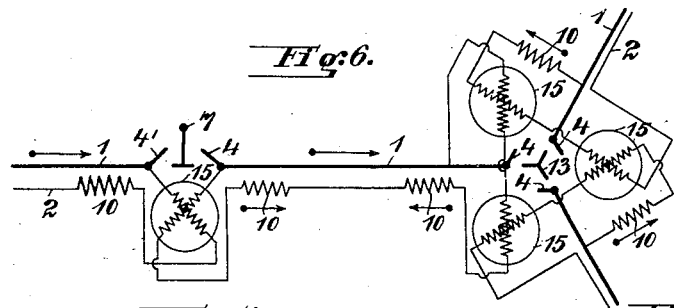
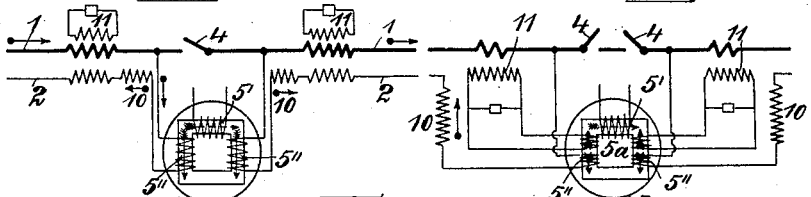
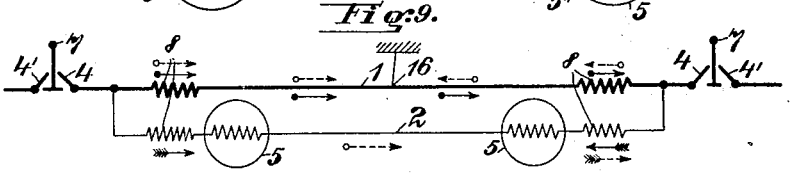
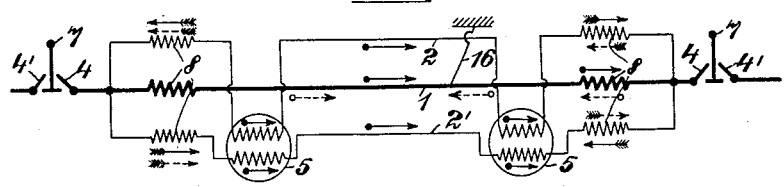
Witnesses:
Madeline Hirsch
Inventor:
Martin Höchstädter

UNITED STATES PATENT OFFICE.

MARTIN HÖCHSTÄDTER, OF BERLIN, GERMANY, ASSIGNOR TO N. V. "LYN-PROTECTIE," MAATSCHAPPIJ TOT EXPLOITATIE VAN ELECTRO-TECHNISCHE EN ANDERE OCTROOIEN, OF THE HAGUE, NETHERLANDS, A DUTCH CORPORATION.

SYSTEM FOR PROTECTING ELECTRIC-CURRENT-DISTRIBUTING NETS AGAINST TEMPORARY INTERRUPTIONS.

1,404,437.  Specification of Letters Patent.  Patented Jan. 24, 1922.

Application filed October 20, 1914. Serial No. 867,684.

(GRANTED UNDER THE PROVISIONS OF THE ACT OF MARCH 3, 1921. 41 STAT. L., 1313.)

*To all whom it may concern:*

Be it known that I, MARTIN HÖCHSTÄDTER, a subject of the German Emperor, residing at 186 Kurfürstendamm, Berlin, Germany, have invented certain new and useful Systems for Protecting Electric-Current-Distributing Nets Against Temporary Interruptions, of which the following is a specification.

My invention relates to electric mains, underground cables or overhead transmission lines as well, with a view to control electric networks by sections, such as to automatically cause the operation of signals at the terminals of an injured portion of the main or to automatically disconnect from the system only the defective portion when its insulation is mechanically or electrically affected. A primary object of the invention is to operate the controlling system even during the formation period of leakages and breakdowns and in the case of undue overtension (excess voltage) thereby or otherwise locally produced, i. e. providing a general safety means to protect electric networks section by section against all kinds of disturbances originating within such systems or networks and thus rendering electric power transmission safer than heretofore.

The arrangement according to my invention involves the addition of a special conductor, specially connected and arranged in relation to the respective main, which special conductor will hereinafter be called, "control conductor."

In ordinary working condition a well defined state of electric equilibrium is kept up between each main and its respective control conductor by way of which releasing devices or operating devices interpolated in the control sections keep the section switches "switched in." However, in the event of a leakage, breakdown, or other defect, the relative electric state of equilibrium mentioned above between each two co-ordinated and co-operating conductors will be disturbed.

Now, it is a prominent feature of my invention in order to safely and simply bring about the above said conditions to provide said one or more control conductors in proximity to the respective metallic main to be controlled, either within the main part of its electric field or imbedded in its metallic interior. The control conductor or conductors when connected to the main at both ends of a section and when imbedded into the metallic core of the main may form part of its copper strands lightly insulated from the rest and thus may either be carrying useful current or be free from it. While preferred forms of systems of connections embodying this invention are illustrated upon the accompanying sheet of drawings, yet it is to be understood that minor detail changes may be made without departing from the scope thereof.

Figs. 1, 2, 3, and 4, show how to insulate the control conductor as a part of the copper core of the main conductor.

Fig. 4, also shows a special construction of the main consisting of a core and of a mantle conductor.

Fig. 5 illustrates diagrammatically a form of my invention with one control conductor and a main conductor.

Fig. 6, shows another diagram with a branching point.

Fig. 7, is a similar diagram which allows a balance of phase-displacement.

Fig. 8, indicates a similar diagram for a subdividing point having the part of useful current flowing through the control conductor neutralized within the relay.

Fig. 9, is a modification of Fig. 5.

Fig. 10, is a control system with a plurality of control conductors for each main conductor.

Figs. 5, 6, 9, and 10, each represent a line section each end of which is a distributing or branching point, which points may also consist of a transformer station or a substation. Any desired number of such sections may be assumed as connected in series or parallel or in ring lines to build up the electric network.

Figs. 1, 2, and 3, indicate how to preferably build up the main conductor (1) and control conductor (2) both forming one solid cable but insulated from one another by a comparatively very thin insulation (3). This arrangement of stranded conductors also strengthens and simplifies the construction to such an extent that practically no complications and no appreciable enhancement of price is brought about compared with an ordinary copper cable. Besides this the control conductor according to the diagrams Figs. 5 to 10, is to be connected to its main at the terminals of each section, thus, especially when used for carrying useful current the control conductor will form part of the main not only in a mechanical but also in an electrical sense. These diagrams do not illustrate the structure of the conductors, but it will be understood that any suitable conductor structure may be adopted for the circuit arrangements shown in these diagrams, for instance any one of the cable structures illustrated by Figs. 1 to 4 may be employed.

Fig. 1, shows the control conductor in flat form occupying only part of the surface of the main, whereas in Fig. 2, the control conductor fully surrounds concentrically its main conductor. According to Fig. 3, the weakly insulated control conductor may be arranged anywhere in the interior of the main conductor. In Fig. 4 the main conductor comprises a core (1ª) and a sleeve or mantle (1).

The purpose of the subdividing of the main core into a core 1ª and a mantle (1) insulated therefrom is to free the core (which carries a considerable part of the useful current) from all charging current which flows into the section on account of its electrostatic capacity. If therefore, as more fully explained below, a control system including the control conductor (2) is governed by the core conductor, i. e. by way of the inductive coil 12 (Fig. 4) the influence of the normal charging currents of the section can be excluded from the control system.

Figs. 5 to 10 show diagrams for only one main conductor of multi-conductor or polyphase network, the control system for each one being perfectly independent of, and equal to the others. The arrows with a dot or circle at their back end indicate electric currents, the feathered ones indicate magnetic fields; the arrows shown in full lines indicate currents and fields in the normal working condition of the system and the arrows shown in dotted lines indicate currents and fields as they result from a defective condition of the system.

In Fig. 5, the main conductor (1) to be controlled is provided with the control conductor (2) the insulation (3) of which is not shown in Figs. 5 to 10 of the drawing, it being understood, as stated above, that the detail construction of main conductor, control conductor, and insulation, may be according to any one of Figs. 1 to 4. The releasing or operating devices (5) preferably differential relays, actuate the switches 4 and 4' in any well known or approved manner (not shown). The control conductor (2) is connected at 6 to the main conductor at each section end. Transformer stations (7) are the distributing points in this case. At each section end there are voltage changing devices (8) having their primary coils included in the main conductor 1 and their secondary coils in the control conductor 2. These devices combine to a certain extent, features of current transformers and booster transformers, they supply, in relation to the main current, an additional tension into the control conductor without disturbing appreciably the conditions of the main circuit. These transformers, therefore, together with the ratio of resistances define the ratio of the main current to the control current. The secondary windings of the transformers (8) may be connected as well in series as in opposition, in the same direction or contrary to the useful current.

During normal operation the transformers 8 permit a current to flow in the control conductor, this current bearing a certain proportion to the main current regarding intensity or phase-displacement or both, upon which relation the differential relays are adjusted. Now, in case of leakage, the electric equilibrium of the current relations in the four windings of the transformers 8 is disturbed and another distribution of currents takes place. These conditions are shown by way of example by the arrows in Fig. 5, which indicate the direction of currents and inductions in a certain case when the disturbance by leakage results in reversing the induction in the transformer 8 situated on the right of the drawing. Thereby the current in the control conductor is altered with respect to the main current. In case of a breakdown of the thin insulation between control conductor and main conductor at the defective spot as indicated at 16 the action of the control system is not essentially different but rather enchanced each transformer 8 now working upon its own circuit 1—2—16. Therefore in any case of leakage or defect the equilibrium of the differential relays 5 will be interfered with and thereby the section switches actuated.

It is a further advantage of my invention that the conductors 1 and 2 and the relays or operating devices 5 being normally in closed circuit condition, the working order of the control system is constantly visible. Furthermore a high degree of sensitiveness of the control system even running without load, is obtainable, and a very reliable operation of the entire net is attained on account of the whole control system forming part of the main conductor itself and thus offering no additional weak points of insulation.

Another form of this invention is shown by Fig. 6, which refers to the case when the nearly pure capacity charging currents flowing into the control conductor 2 are used for maintaining the normal equilibrium of the control system. This form of the system also offers a very high sensitiveness to incipient defects or leakage. By means of ohmic resistances 10 interpolated in the control circuit 2, by transformers of the same character as those indicated at 8 in Fig. 5, or by both of these means together the useful current may be sufficiently or fully prevented from entering the control conductor thus leaving only a charging current inflow of well defined intensity into the control conductor at each section end, the control conductor being supposed to occupy part of the surface of the main conductor, for instance as shown by Figs. 1 and 2. It is preferable, within certain limits, to shape the control conductor so as to increase its surface and own ohmic resistance. These capacity currents therefore will be practically independent of the current load of the line section during normal working condition and determined only by voltage and capacity of the section. Therefore they may be used to maintain a condition of equilibrium in appropriate relays for instance the control currents flowing into a plurality of section ends of one phase at the same station of a line may operate a common differential relay 15.

Relays of this kind (15) are to normally maintain the section switches 4 and 4' in their operative position but to actuate them in order to break the main circuit in case of disturbance. These relays otherwise may be of any recognized type, preferably of the electro-dynamometrical or induction type. A commencing defect in the control section 2 concerned causes current shocks and waves which, being mostly watt currents, alter the balanced position of the movable part of the relays 15 in one direction or other whereby the throwing open of the switch 4 or 4' on the faulty side of the relay is effected. The right hand part of Fig. 6 indicates a branching point 13 with correspondingly adapted apparatus. As above mentioned transformers 8 may replace or complete the function of the resistances 10 at this branching point also.

Fig. 7 is a diagram showing the use of my invention in connection with a distributing system having an ordinary switching off station without any current distributing branch controlled by the switch. In this case an ordinary stationary magnetic relay having transformer coils, which responds to a current of either direction will be sufficient. The two coils 5" are oppositely wound on an iron core and balanced. In case of disturbances the magnetic equilibrium in the iron is affected and induction is produced in the auxiliary coil 5' according to the difference in intensity and phase—displacement between the two control currents and thus the switch 4 is actuated. The device for actuating the switch 4 when a current is induced in the coil 5', has not been shown in Figs. 7 and 8, devices of this character being well known in the art. The structural relation of the main conductor 1 to the control conductor 2 is not illustrated in these views, being of any suitable character, for instance as shown in any one of Figs. 1 to 4. The normal equilibrium of intensity and phase-displacement between said two currents may be regulated by means of transformers 11 acting upon a second secondary circuit with adjustable impedance.

Fig. 8, represents a modification of Fig. 7, employing the same relay which by suitable devices of well known character (not shown) connected with the auxiliary coil 5' operates the two interlocked switches 4. The windings 5" again carry the control currents. The windings $5^a$ together with the transformers 11, however, serve to neutralize the effect of the useful current driven into the control conductor by the drop of voltage. The feathered arrows show how this part of the magnetic field of the windings 5" is counter-balanced by the adjustable current of the windings $5^a$.

Fig. 9 shows a modification of Fig. 5. While Fig. 5 amply allows the use of control conductors of any described shape and position, the present modification prefers the use of a control conductor 2 situated in the interior of and thus electrostatically shielded by the main conductor 1. The transformers 8 are connected in series and opposite to and compensating the normal drop of voltage in the section, thus rendering the control conductor nearly perfectly free from current, useful current and capacity current as well.

Simple relays 5 are interpolated in the control conduit 2 to actuate by means of suitable devices (not shown) the respective section switches 4 on both sides of the transformer station 7 in case of disturbance when the current compensation in the control circuit 2 is upset.

The modification according to Fig. 10, shows how to employ two or more control conductors 2 and 2' co-ordinated to and preferably in the interior of each main conductor. The secondary windings of the transformers 8 are preferably sub-divided to form part of each control circuit. They are according to the arrows, connected in such a manner as to act oppositely in their respective circuits at the same section end and oppositely to each other in each control circuit 2 and 2'. Thereby the control conductors 2 and 2' in spite of being continually under the electrostatic and magnetic influence of their main conductor, may normally carry their share of the current load, and mutually maintain the balance of differential relays 5 through which flow both of the control currents. In case of defect, however, the fixed relation between the control currents in 2 and 2' is upset both by the changed electromagnetic induction and by a possible local destruction of insulation whereby the section switches on both sides of the damaged section are actuated through the medium of any devices of well known or approved character (not shown) controlled by the differential relays 5.

Fig. 10, as an example of using a plurality of conductors, of course, may be modified in various ways, i. e. the mutual intensity and direction of the action of the transformers 8 may be altered in any way which will enable me to establish normally a certain proportion between the control currents at each terminal and to alter this proportion in case of defect.

I claim:

1. Control system for the constituent sections of an electric current distributing net, each section comprising a main conductor, a control conductor both operating under the same working pressure and the current passing through the control conductor being dependent upon the condition of the main conductor, safety means adapted to be actuated by the current in said control conductor upon a defect occurring with the main conductor, and transformers interpolated between said main conductor and control conductor.

2. Control system for the constituent sections of an electric current distributing net, each section comprising a main conductor, a control conductor both operating under the same working pressure and the current passing through the control conductor being dependent upon the condition of the main conductor, transformers and electromagnetic releasing devices interpolated between said main and control conductors and adjusted to be inoperative during normal operation but to be operative upon a defect occurring with the main conductor, and switches adapted to be actuated by said releasing devices.

3. Control system for the constituent sections of an electric current distributing net, each section comprising a main conductor, a control conductor both operating under the same working pressure and the current passing through the control conductor being dependent upon the condition of the main conductor, and safety means adapted to be actuated by said control conductor current upon a defect occurring with the main conductor, and tension-affecting elements including voltage changing devices adapted to induce additional tension by the main current into the control conductor.

4. Control system for the constituent sections of an electric current distributing net, each section comprising a main conductor, a control conductor both operating under the same working pressure and the current passing through the control conductor being dependent upon the condition of the main conductor, and safety means adapted to be actuated by said control conductor current upon a defect occurring in the main conductor and tension affecting elements interposed between said conductors the tension elements being oppositely connected to the normal drop of voltage, so that the control conductor is normally without current.

5. Control system for the constituent sections of an electric current distributing net, each section comprising a main conductor, a control conductor both operating under the same working pressure and the current passing through the control conductor being dependent upon the condition of the main conductor, and safety means adapted to be actuated by said control conductor current upon a defect occurring in the main conductor and tension-affecting elements interposed between said conductors, the tension elements being oppositely connected to the normal drop of voltage so that the control conductor is normally without current and single relays may be employed.

6. Control system for the constituent sections of an electric current distributing net, each section comprising a main conductor, a control conductor both operating under the same working pressure and the current passing through the control conductor being dependent upon the condition of the main conductor, and safety means adapted to be actuated by said control current upon a defect occurring in the main conductor, said safety means including differential relays influenced by the main conductor current and by the control conductor current.

7. Control system for the constituent sections of an electric current distributing net, each section comprising a main conductor, a control conductor permanently connected with the main conductor at each end of the section, both conductors operating under the same working pressure and the current passing through the control conductor being dependent upon the condition of the main conductor, and safety means adapted to be actuated by said control conductor current upon a defect occurring in the main conductor, said safety means including relays through which flow the control conductor currents of two adjacent branches.

8. Control system for the constituent sections of an electric current distributing net, each section comprising a main conductor, a control conductor both operating under the same working pressure and the current passing through the control conductor being dependent upon the condition of the main conductor and safety means adapted to be actuated by said control conductor current upon a defect occurring in the main conductor, tension-affecting elements interposed between said conductors, said tension elements normally equalizing strength and phase of the currents of two adjacent sections and a differential relay related to both of said sections.

9. Control system for the constituent sections of an electric current distributing net, each section comprising a main conductor, a control conductor both operating under the same working pressure and the current passing through the control conductor being dependent upon the condition of the main conductor, and safety means adapted to be actuated by said control conductor current upon a defect occurring in the main conductor, and tension-affecting elements related to said conductors, said tension elements including current transformers for normally neutralizing the influence of the drop of tension upon the safety means.

10. Control system for the constituent sections of an electric current distributing net, each section comprising a main conductor and a plurality of control conductors, permanently connected with the main conductor at each end of the section, all of said conductors operating under the same working pressure and the current passing through the control conductors being dependent upon the condition of the main conductor, transformers in circuit with said control conductors and circuit-breaking switches controlled by said transformers and maintained in their inoperative circuit closing position during normal operation, said transformers operating to normally neutralize the influence of the drop in tension upon said switches.

11. Control system for the constituent sections of an electric current distributing net, each section comprising a main conductor, a control conductor both operating under the same working pressure and the current passing through the control conductor being dependent upon the condition of the main conductor, and safety means adapted to be actuated by said control conductor current upon a defect occurring in the main conductor, and tension affecting elements including ohmic resistances to promote the predominance of the capacity charging current in the control conductor.

12. In combination with a sectional main conductor, a series of control conductors, each connected with the main conductor at both ends of the respective section, transformers included both in main and control conductors, to normally produce a condition of equilibrium, and circuit-controllers operated by a disturbance of such equilibrium.

13. In combination with a sectional main conductor comprising a core and a shell, a series of control conductors each connected with the main conductor at both ends of the respective section, transformers included in the core portion circuit of the main conductor and in the control conductors, to normally produce a condition of equilibrium, and circuit controllers operated by a disturbance of such equilibrium.

14. In combination with a sectional main conductor, a series of control conductors having a resistance different from that of the main conductor, each control conductor being connected with the main conductor at both ends of the respective section, transformers included both in main and control conductors and having a transformer ratio differing from the ratio of the resistance of the main conductor to that of the control conductor, and circuit-controllers operated by a disturbance of the electrical condition normally prevailing in the control conductor.

15. In combination with a sectional main conductor, a series of control conductors having a resistance different from that of the main conductor, each control conductor being connected with the main conductor at both ends of the respective section, transformers included both in main and control conductors and so connected relatively to the normal drop of voltage in the main conductor that the control conductor will be normally without current, and circuit-controllers operated by a disturbance of the electrical condition normally prevailing in the control conductor.

16. In combination with a sectional main conductor, a plurality of control conductors each connected with the same section of the main conductor at both ends thereof, section circuit controllers related to the main conductor sections, transformers in circuit with each of the control conductors connected with the same section, and devices, under the electrical influence of said transformers for actuating said circuit-controllers, said transformers operating to normally neutralize the influence of the drop in tension on said devices.

17. In combination with a sectional main conductor, a series of control conductors each connected with the main conductor at both ends of the respective section, means for promoting the predominance of capacity currents in the control conductors, circuit-controllers related to the main conductor sections, and devices, related operatively to said control conductors and adjusted to the said capacity currents, for actuating said circuit-controllers.

18. In combination with a sectional main conductor, a series of control conductors each connected with the main conductor permanently at both ends of the respective section, circuit-controllers related to the main conductor sections, and devices each related operatively to the control conductors of two adjacent sections, for actuating said circuit controllers.

In testimony whereof I have hereunto affixed my signature in the presence of two witnesses.

MARTIN HÖCHSTÄDTER.

Witnesses:
 HENRY HASPER,
 WOLDEMAR HAUPT.